A. J. COLE.
WATER ELEVATOR.
APPLICATION FILED MAR. 26, 1915.
1,291,768.
Patented Jan. 21, 1919.
3 SHEETS—SHEET 2.
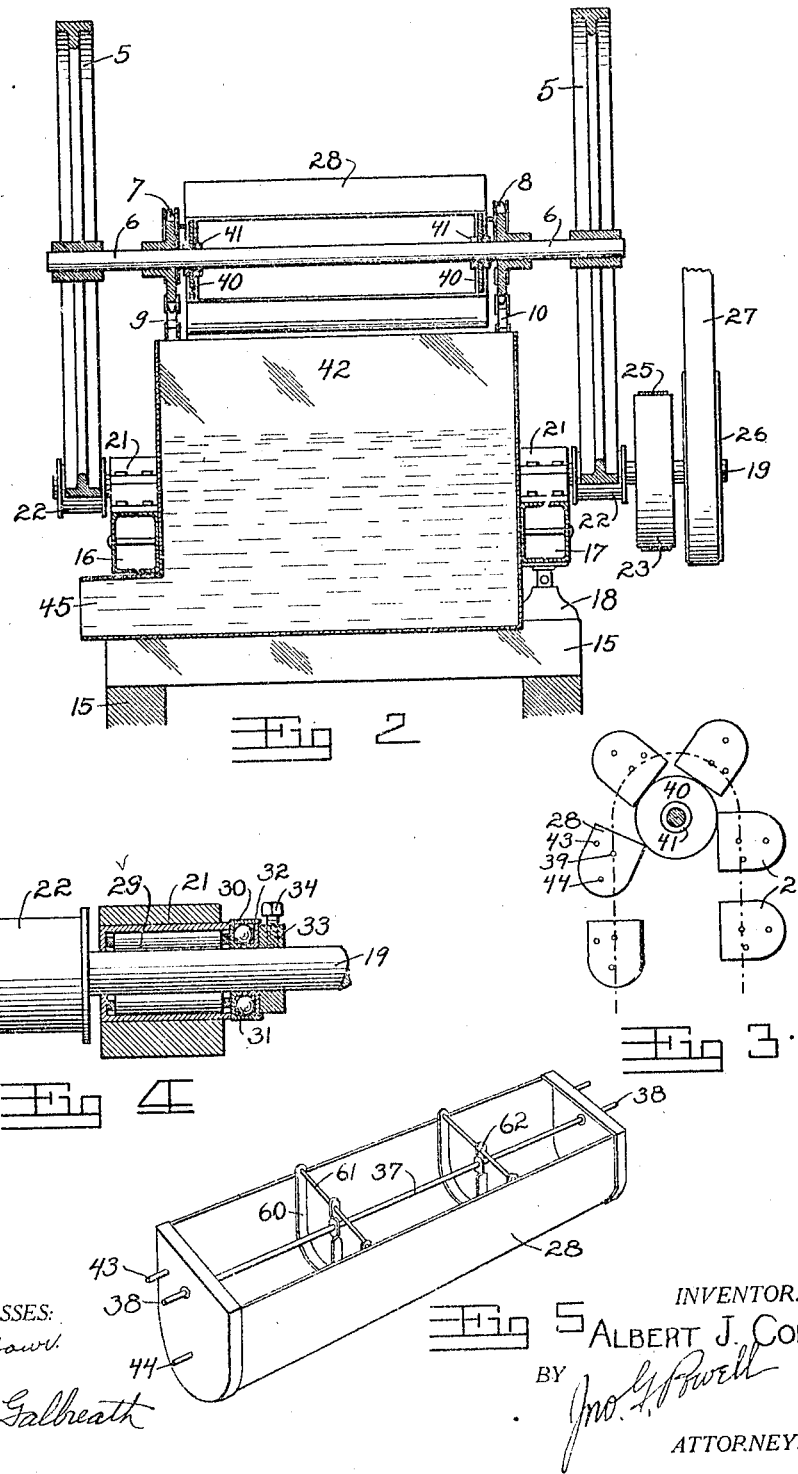
WITNESSES:
INVENTOR.
ALBERT J. COLE.
BY
ATTORNEY.

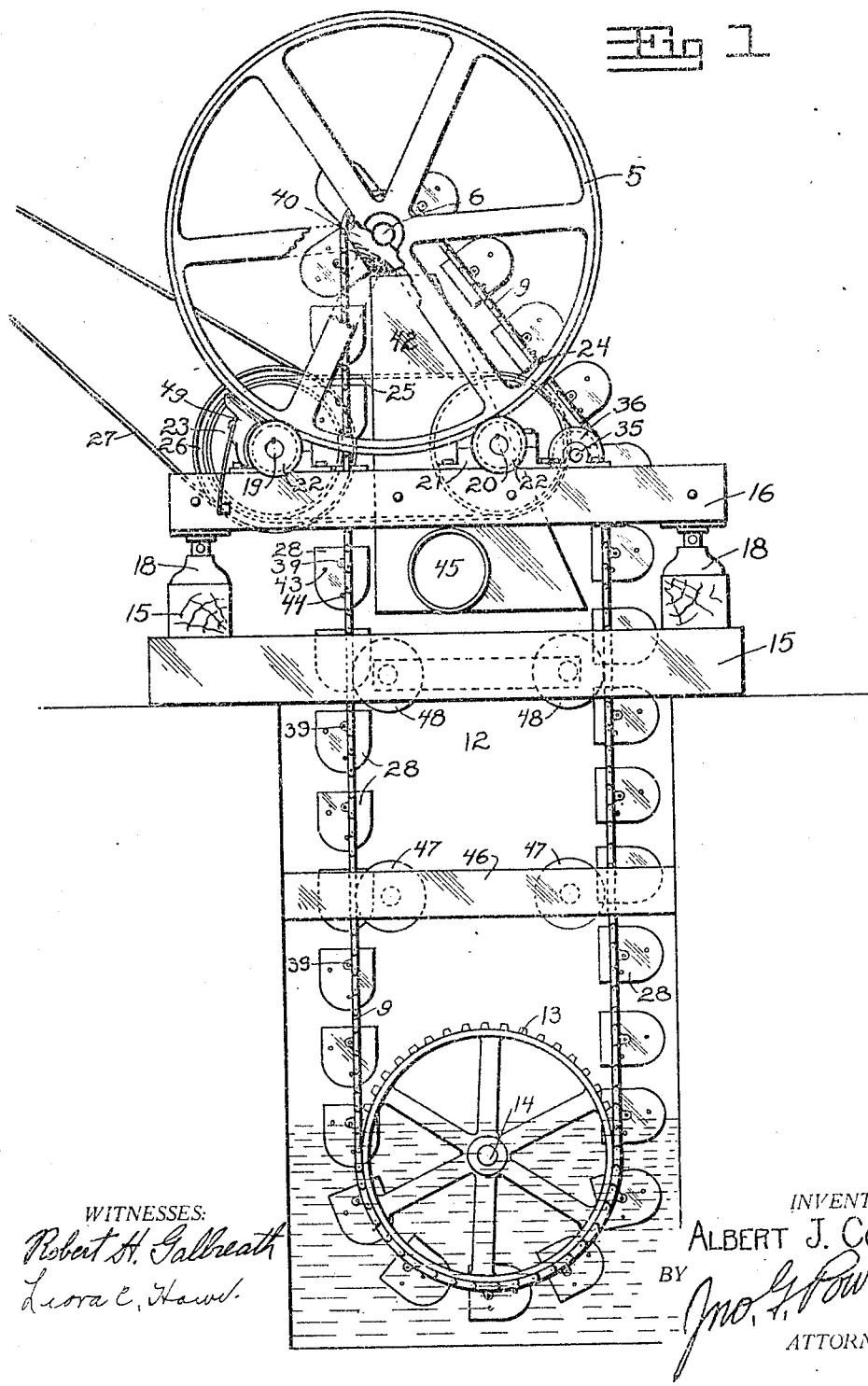

A. J. COLE.
WATER ELEVATOR.
APPLICATION FILED MAR. 26, 1915.

1,291,768.

Patented Jan. 21, 1919.
3 SHEETS—SHEET 3.

WITNESSES:
Robert H. Galbreath
Leora C. Hawl.

INVENTOR.
ALBERT J. COLE.
BY Jno. G. Powell
ATTORNEY.

UNITED STATES PATENT OFFICE.

ALBERT J. COLE, OF DENVER, COLORADO.

WATER-ELEVATOR.

1,291,768.　　　　　　Specification of Letters Patent.　　　Patented Jan. 21, 1919.

Application filed March 26, 1915. Serial No. 17,138.

*To all whom it may concern:*

Be it known that I, ALBERT J. COLE, a citizen of the United States, residing in the city and county of Denver, State of Colorado, have invented certain new and useful Improvements in Water-Elevators; and I do declare the following to be a full, clear, and exact description of my invention, such as will enable others skilled in the art to which it appertains to make and use the same, reference being had to the accompanying drawings, and to the figures of reference marked thereon, which form a part of this specification.

My invention relates to improvements in water elevators, and is of the general nature set forth in patent granted to my father, now deceased, Henry Cole, dated September 9th, 1913, #1,072,430, the said invention having for its object the provision of a water elevator, the construction of which is adapted to relieve friction, and thus reduce to a minimum the motive power necessary to operate the machine.

In the following detail description of my invention, many other objects and advantages, embodied in its construction and arrangement, will appear and such objects and advantages will be substantiated in the use of the invention.

Figure 6:
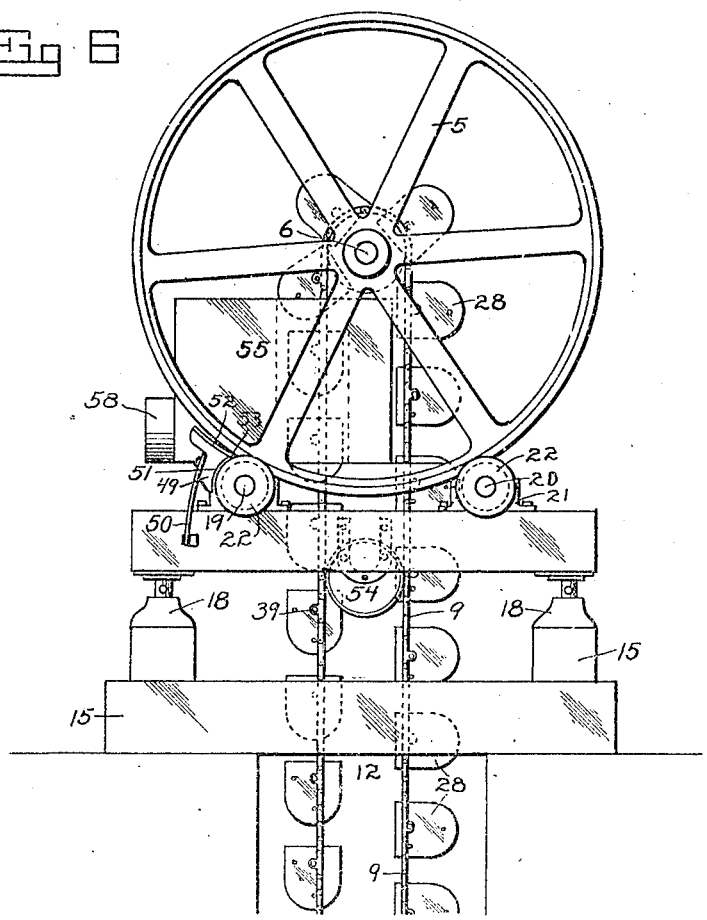
Figure 7:
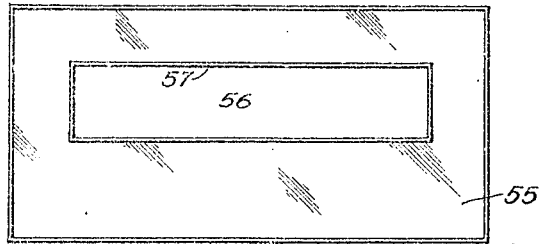

In the accompanying drawing, Figure 1 is a side elevation view of the invention; Fig. 2 is a vertical cross sectional view through Fig. 1; Fig. 3 is a diagrammatic view showing the manner in which the buckets are placed in the dumping position; Fig. 4 is a sectional view taken through the journal boxes of the elevator; Fig. 5 is a perspective view of one of the buckets employed in the invention; Fig. 6 is a side elevation view of a modified form of the invention; and Fig. 7 is a plan view of the water receiver used in connection with said last named form.

Let the numeral 5 designate each of the two journal wheels on the pulley shaft 6. Said journal wheels 5 are mounted upon opposite extremities of the shaft 6. Two sprocket wheels 7 and 8 are also mounted upon the shaft 6, the said sprocket wheels 7 and 8 being made fast to said shaft and turn with the latter. The endless sprocket chains 9 and 10 respectively pass over said sprocket wheels 7 and 8 and descend into the well 12. Said sprocket chains 9 and 10 pass around sprocket wheels 13 journaled in the bottom of said well by means of a shaft 14, upon which said sprocket wheels 13 are mounted.

The top of the well 12 is surrounded by means of a framework 15, upon which frame-work, suitably spaced channel beams 16 and 17 are supported by means of jack screws 18. By proper adjustment of the said jack screws, the said channel beams 16 and 17 may be trued or properly adjusted. Shafts 19 and 20 extend parallel with the shaft 6 and are journaled upon the channel beams 16 and 17 in journal boxes 21. The shafts 19 and 20 are separated, or spaced apart, as more clearly shown in Fig. 6. Upon the opposite extremities of the said shafts 19 and 20, spool-shaped rollers 22 are made fast and upon said rollers the journal wheels 5 are mounted. In other words, the journal wheels 5 engage with said rollers 22 and turn upon them. Upon the shafts 19 and 20, band carrying wheels 23 and 24 are secured, said band carrying wheels being made fast to said shafts. A hand belt 25 passes over the band carrying wheels 23 and 24 and connects shafts 19 and 20. A second band carrying wheel 26 is mounted on the shaft 19 and is driven by means of a belt 27, which passes around said wheel. By means of this band belt, power is transferred to the shaft 19, from which power is also transmitted to the shaft 20, by reason of the band carrying wheels 23 and 24 and their connecting belt 25. Thus, it will be seen that both shafts 19 and 20 are caused to revolve together and the spool-shaped rollers 22 revolved therewith, these rollers being engaged by the journal wheels 5, causing the latter to revolve and revolve shaft 6 therewith, which in turn, revolves the sprocket wheels 7 and 8, thereby operating the endless sprocket chains 9 and 10, said chains carrying water elevating buckets 28. The shafts 19 and 20 engage roller bearings 29, the said roller bearings 29 being arranged in each of the journal boxes 21. At the inner extremity of each of these journal boxes 21, an angle guide-way 30 is arranged, and in which guide-way, ball bearings 31 are mounted, said ball bearings 31 being held in the guide-way 30 by means of a member 32, mounted upon the shafts 19 and 20 and held in position by means of a member 33, which is adjustably mounted upon said shafts and held in adjusted position by means of a set screw 34. The ball bearings 31 relieve any friction which might result incident to end thrust movement of said shafts 19 and 20, while roller bearings 29 relieve friction incident to the revolving of said shafts 19 and 20.

Stub journals 35 are mounted upon the channel beams 16 and 17 and carry rollers 36, over which, the sprocket chains 9 and 10 pass, said rollers 36 acting to space said chains after the latter leave the sprocket wheels 7 and 8, whereby said chains are caused to pass vertically into the well.

The sprocket chains 9 and 10 are connected by the buckets 28, the said buckets, each, having a rod 37 extending therethrough and having its extremities exposed to the exterior thereof, forming spindles 38, which are journaled in lugs 39, mounted upon the chains 9 and 10. Each bucket is open at the top and its bottom is oval shaped in cross section. The spindles 38 are near the top of the buckets, whereby the said buckets normally occupy vertical positions with their sides uppermost, the bottoms of the buckets being farther from the pivotal center than the top of said buckets. Upon the shaft 6, two suitably spaced disks 40 are journaled, the said disks being held in position upon the shaft by means of collars 41, mounted upon said shaft on opposite sides of said disks 40. The peripheries of these disks 40 are successively engaged by the opposite extremities of the buckets 28, during the travel of the chains 9 and 10, comprising the conveyer. The said disks 40 act upon the buckets, causing the latter to turn upon their journals to dumping positions. As each bucket passes over the disks 40, it is turned to an inverted position, causing its contents to be emptied into a water receiver 42. Stop pins 43 are mounted on opposite extremities of each bucket and engage with the endless chains 9 and 10 after the buckets have been turned to the dumping position, the said stop pins 43 limiting the movement of the said buckets upon their journals 38. After the buckets have been thus emptied of their contents, they assume positions on the downward moving side of the endless conveyer, said buckets being maintained in their inverted positions until having passed the rollers 35, whereupon, they are carried down into the well in horizontal positions. Now, as the buckets on the downward moving side of the conveyer reach the sprocket wheels 13, the buckets occupy positions to scoop up the water in the well, and as each bucket assumes the upward moving side of the conveyer, the same finds its center of gravity and turns upon its journals to the vertical position. Upon the opposite extremities of each bucket, near the lower edge thereof, pins 44 are mounted, said pins engaging with the sprocket chains 9 and 10 when the buckets are in their vertical positions, or on the upward moving side of the conveyer, whereby said buckets are held against rocking upon their journals during their upward travel.

The water receiver 42 is set in such position as to receive the water from the buckets 28 when the latter are tilted to their dumping positions by virtue of the disks 40, the said buckets being tilted and emptied of their contents as soon as said buckets engage with the disks 40. The water receiving receptacle 42 is provided with an outlet pipe 45, through which the water may be conveyed to a reservoir, or other suitable place.

A transverse member 46 is placed within the well and spans the width of the latter, the said transverse member 46 being provided with idle rollers 47, which engage with the endless chains 9 and 10. Other idle rollers 48 are also journaled upon the framework 15 and are also engaged by said chains 9 and 10. These idle rollers accomplish the purpose of separating the two runs of the chains 9 and 10. As soon as the journal wheels 5 begin revolving in the reverse direction, an automatic brake is actuated by one of said journal wheels to cause same to engage with the said journal wheel and lock the latter against reverse rotation. This brake consists of a shoe 49, supported by means of a spring 50 adjacent to the periphery of one of the journal wheels 5. The shoe 49 is provided with a part 51, which is adapted to engage with one of the rollers 22, and said shoe is also provided with another part 52 adapted to engage with the periphery of one of the journal wheels 5, the said shoe being also provided with a wedge-shaped part 53 adapted to engage between one of said rollers and one of said journal wheels. The spring 50 has a normal tendency to move said shoe 49 into a braking position, but while the journal wheels 5 are being revolved in their proper direction to elevate the water, said brake shoe 49 is normally actuated to be displaced from its operative, or braking position. When, however, the machine is stopped, or the operating power is relieved, the weight on the upward moving side of the conveyer reverses the direction of rotation of the journal wheels 5. As soon as the reverse rotation takes place, the brake will be applied, in the manner heretofore described, and immediately stop said reverse rotation.

The form of my invention shown in Figs. 6 and 7 embodies the different construction and arrangement, which will now be described. The upward and downward moving sides of the conveyer, or runs of the chains 9 and 10 are not held in such a widely separated condition, as shown in Fig. 1, the chains in this form passing directly over the sprocket wheels 7 and 8 and descend vertically therefrom into the well. An idle roller 54 is journaled upon each of the channel irons 16 and 17 and are engaged on opposite sides by the chains 9 and 10.

The water receiving receptacle 55 is provided with a centrally located passage, or opening 56, through which the chains 9 and 10 and the buckets 28 pass. The buckets 28 pass through said passage, or opening 56 as they are carried upwardly, the contents of the buckets being dumped into the receptacle 55 in the rear of the center wall 57. The said central wall 57 surrounds the opening 56 and extends upwardly into said receptacle. The water, after having been dumped into the receptacle 55, passes around the wall 57 and through the pipe 58, by means of which pipe, the water may be conveyed to any suitable place. The rod 37 serves as a longitudinal brace for the buckets 28, one of said rods being passed through each of said buckets. Braces 60 are secured to the inner wall of the buckets 28, their upper extremities being connected by transverse rods 61, while vertical braces 62 connect the braces 60 with said rods 61, the rods 37 being passed through these vertical braces 62. By reason of the manner in which the buckets are braced, the same are prevented from sagging intermediate their extremities and are in other respects made substantial.

While I have described and illustrated herein a specific form of my invention, it is understood that I am not limited thereto and that the same may be modified and varied without departing from the spirit of the invention, or the scope of the appended claims.

Having thus described my invention, what I claim and desire to secure by Letters Patent is:

1. An elevator, comprising spaced apart journal wheels, a pulley shaft connecting said journal wheels and forming the axis of the latter, two parallel spaced apart shafts journaled below the plane of said pulley shaft, said parallel shafts having rollers made fast at their extremities and upon which said journal wheels are journaled, means for applying power to one of said parallel shafts, a shoe adapted to automatically engage one of said journal wheels, and a wedge carried by said shoe and adapted to engage between one of said journal wheels and one of said rollers.

2. An elevator, comprising spaced apart journal wheels, a pulley shaft connecting said journal wheels and forming the axis of the latter, a second shaft journaled below the plane of said pulley shaft, said second shaft having rollers made fast to each extremity thereof, said rollers being engaged by said journal wheels, and a spring actuated brake positioned to normally engage one of said rollers and one of said journal wheels, said brake having a shoe part adapted to engage one of said journal wheels and a wedge part adapted to engage between one of said rollers and one of said journal wheels.

In testimony whereof, I affix my signature in the presence of two witnesses.

ALBERT J. COLE.

Witnesses:
E. P. DENNHARDT,
JOHN G. POWELL.

Copies of this patent may be obtained for five cents each, by addressing the "Commissioner of Patents, Washington, D. C."